United States Patent
Yu

(10) Patent No.: US 10,728,594 B2
(45) Date of Patent: Jul. 28, 2020

(54) METHOD AND APPARATUS FOR TRANSMITTING DATA OF MOBILE TERMINAL

(71) Applicant: TENCENT TECHNOLOGY (SHENZHEN) COMPANY LIMITED, Shenzhen (CN)

(72) Inventor: Xueliang Yu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 184 days.

(21) Appl. No.: 15/937,238

(22) Filed: Mar. 27, 2018

(65) Prior Publication Data
US 2018/0220170 A1 Aug. 2, 2018

Related U.S. Application Data

(63) Continuation of application No. PCT/CN2017/072195, filed on Jan. 23, 2017.

(30) Foreign Application Priority Data

Jan. 28, 2016 (CN) .......................... 2016 1 0058950

(51) Int. Cl.
*H04L 12/00* (2006.01)
*H04N 21/239* (2011.01)
(Continued)

(52) U.S. Cl.
CPC ....... *H04N 21/239* (2013.01); *H04N 21/2187* (2013.01); *H04N 21/23106* (2013.01);
(Continued)

(58) Field of Classification Search
CPC ........... H04N 21/2662; H04N 21/2187; H04N 21/23106; H04N 21/44245;
(Continued)

(56) References Cited

U.S. PATENT DOCUMENTS 7,016,409 B2 * 3/2006 Unger ................ H04N 21/2343
375/240.02
7,987,285 B2 * 7/2011 Melnyk ............ H04N 21/44004
709/233
(Continued)

FOREIGN PATENT DOCUMENTS

CN 101252689 A 8/2008
CN 102378065 A 3/2012
(Continued)

OTHER PUBLICATIONS

The State Intellectual Property Office of the People's Republic of China (SIPO) Office Action 1 for 201610058950.9 dated Jul. 2, 2018 10 Pages (including translation).
(Continued)

*Primary Examiner* — Frantz Coby
(74) *Attorney, Agent, or Firm* — Anova Law Group, PLLC

(57) ABSTRACT

The present disclosure discloses a method and an apparatus for transmitting data of a mobile terminal. The method includes: obtaining cached data of a mobile application on the mobile terminal from an uploading cache, the cached data being coded and synthesized streaming data; obtaining a cache ratio of the cached data while in an online state, the cache ratio being a ratio of the cached data to the entire uploading cache in real-time; determining whether the cache ratio exceeds a preset cache ratio threshold; adjusting a bitrate of the cached data to obtain an adjusted bitrate if it is determined that the cache ratio exceeds the preset cache ratio threshold; and transmitting the cached data to a receiving terminal according to the adjusted bitrate while in the online state with a network, so that the receiving terminal plays, according to the cached data, live content corresponding to the cached data.

18 Claims, 6 Drawing Sheets

(51) Int. Cl.
  *H04N 21/2662* (2011.01)
  *H04N 21/414* (2011.01)
  *H04N 21/442* (2011.01)
  *H04N 21/433* (2011.01)
  *H04N 21/2187* (2011.01)
  *H04N 21/231* (2011.01)
  *H04N 21/2743* (2011.01)

(52) U.S. Cl.
  CPC ..... *H04N 21/2662* (2013.01); *H04N 21/2743* (2013.01); *H04N 21/41407* (2013.01); *H04N 21/4331* (2013.01); *H04N 21/44245* (2013.01)

(58) Field of Classification Search
  CPC ......... H04N 21/2743; H04N 21/41407; H04N 21/4331; H04N 21/239
  USPC ...................... 709/213; 370/235; 375/240.03
  See application file for complete search history.

(56) References Cited

U.S. PATENT DOCUMENTS

| | | | | |
|---|---|---|---|---|
| 8,218,657 B2* | 7/2012 | Spilo | ..................... | H04L 1/0003 |
| | | | | 375/240.03 |
| 8,230,105 B2* | 7/2012 | Melnyk | ................ | H04N 19/115 |
| | | | | 709/233 |
| 8,621,061 B2* | 12/2013 | Melnyk | ............... | H04L 47/2416 |
| | | | | 709/223 |
| 9,191,664 B2* | 11/2015 | Melnyk | ................ | H04N 19/152 |
| 9,697,124 B2* | 7/2017 | Park | ..................... | G06F 12/0806 |
| 2006/0067229 A1* | 3/2006 | Frederiksen | .......... | H04L 1/0009 |
| | | | | 370/235 |

FOREIGN PATENT DOCUMENTS

| CN | 102413307 A | | 4/2012 | |
|---|---|---|---|---|
| CN | 103294782 A | * | 9/2013 | ............ H04L 12/00 |
| CN | 104486688 A | | 4/2015 | |
| CN | 204929081 U | | 12/2015 | |
| CN | 105744342 A | | 7/2016 | |
| WO | 0046997 A1 | | 8/2000 | |

OTHER PUBLICATIONS

The World Intellectual Property Organization (WIPO) International Search Report for PCT/CN2017/072195 dated Apr. 28, 2017 5 Pages (including translation).

\* cited by examiner

METHOD AND APPARATUS FOR TRANSMITTING DATA OF MOBILE TERMINAL

RELATED APPLICATION

This application is a continuation application of PCT Patent Application No. PCT/CN2017/072195, filed on Jan. 23, 2017, which claims priority to Chinese Patent Application No. 201610058950.9, entitled "METHOD AND APPARATUS FOR TRANSMITTING DATA OF MOBILE TERMINAL" filed with the Chinese Patent Office on Jan. 28, 2016, which is incorporated by reference in its entirety.

FIELD OF THE TECHNOLOGY

The present disclosure relates to the field of the Internet and, specifically, to a method and apparatus for transmitting data for a mobile terminal.

BACKGROUND OF THE DISCLOSURE

Mobile terminals may be used to play video, such as mobile phones, under various network environments including Second Generation mobile network (2G), Third Generation mobile network (3G), Fourth Generation mobile network (4G), or Wireless Fidelity network (WIFI). Due to complexity and changing network state, the stability of played content is relatively low. In an application scenario in which a mobile terminal device shares recorded content in real time, the live content on the mobile terminal device has time sensitivity. If the recorded content is attractive, and draws a lot of attention from a user terminal, it needs to be ensured that the played content does not lag, so as to provide smooth and stable live content to the user terminal, thereby improving the user experience. In a mobile network environment, the state of network is restricted by the distance to the geographic base station to a great extent, and is also affected by the population density. Thus, an original 4G mobile network may degrade to a 3G mobile network, or even degrade to a 2G mobile network. In this way, the decrease of the transmission speed of the mobile network greatly restricts the uploading of the live content. Similarly, in a WIFI wireless network environment, coverage of WIFI hotspots often is incomplete. Because the user terminal is mobile, the strength of WIFI signal received in different locations is also different, and this also affects the stability of the uploading of the live content of the mobile terminal.

Currently, there are three solutions of real-time capturing, encoding, and uploading for most of mobile applications. First, at the beginning of encoding and uploading the live content, a lowest definition and a lowest bitrate are matched in priority. But, according to the encoding and uploading method, the play quality during a live show process remains unchanged, and the user terminals have a relatively poor experience; and optimal picture quality cannot be provided even when the state of network becomes better, and dynamic adjustment cannot be performed when the state of network becomes poor.

Second, when a network jitter becomes poor and cannot meet an uploading speed required by a current bitrate, some coded data frames of the video is dropped to reduce the data volume of the bitrate in an alternative way, so as to perform live uploading. But the disadvantages of the solution are the loss of original compressed image content, the decrease of the frame rate, the decrease of fluency of the video, and the reduction of the amount of content information. Further, the data of a group of images (GOP for short) of key frames of the video needs to be synchronized. It is possible that, with 1 to 2 seconds of image data loss, if not processed properly, the lost data may cause a decoding failure on a playing client-end and abnormal images. It may also cause image jump on the playing client-end, leading to experience of discontinuity, as frequent frame dropping processing can cause the lagging and jumping feeling.

Third, in the process of live uploading the recorded content, the encoder is reconfigured, and the audio and video bitrate is reconfigured according to the current network speed, and live uploading is passively restarted, which can cause the extra process from interruption of the live uploading to re-initialization, consuming addition time and affecting the playing client-end with lag buffering and waiting. If the live uploading establishes multi-layer and complex links, the speed of recovering on the playing client-end is very slow and, in this way, it is inevitable to lose users. If the number of users watching the recorded content is very large, such interruption and recovery are also great challenges to the stability and bandwidth adjustment of servers.

Thus, according to the present disclosure, such existing technical solutions have the following advantages: first, controlling the overall quality by the low bitrate first method cannot flexibly adapted anytime and anywhere; second, even a dynamic control method is used, the method is excessively simple and crude, and can cost relatively large amount of user experience; and third, incurrence of extra cost of operation and overhead of machine scheduling, increasing the probability of accident, and lacking security and robustness.

SUMMARY

Embodiments of the present disclosure provide a method and an apparatus for transmitting data of a mobile terminal, so as to resolve at least the technical problems in related technologies with low flexibility on capturing, encoding, and uploading audio and video content.

According to one aspect of the embodiments of the present disclosure, a method for transmitting data of a mobile terminal is provided. The method for transmitting data of a mobile terminal includes: obtaining cached data of a mobile application on the mobile terminal from an uploading cache, the cached data being coded and synthesized streaming data; obtaining a cache ratio of the cached data while in an online state, the cache ratio being a ratio of the cached data to the entire uploading cache in real-time; determining whether the cache ratio exceeds a preset cache ratio threshold; adjusting a bitrate of the cached data to obtain an adjusted bitrate if it is determined that the cache ratio exceeds the preset cache ratio threshold; and transmitting the cached data to a receiving terminal according to the adjusted bitrate while in the online state with a network, so that the receiving terminal plays, according to the cached data, live content corresponding to the cached data.

According to another aspect of the embodiments of the present disclosure, an apparatus for transmitting data of a mobile terminal is provided. The apparatus for transmitting data of a mobile terminal includes: a memory storing instructions; and a processor coupled to the memory. When executing the instructions, the processor is configured for: obtaining cached data of a mobile application on the mobile terminal from an uploading cache, the cached data being coded and synthesized streaming data; obtaining a cache ratio of the cached data while in an online state, the cache ratio being a ratio of the cached data to the entire uploading cache in real-time; determining whether the cache ratio exceeds a preset cache ratio threshold; adjusting a bitrate of the cached data to obtain an adjusted bitrate if it is determined that the cache ratio exceeds the preset cache ratio threshold; and transmitting the cached data to a receiving terminal according to the adjusted bitrate while in the online state with a network, so that the receiving terminal plays, according to the cached data, live content corresponding to the cached data.

According to still another aspect of the present disclosure, a computer readable storage medium is provided, the computer readable storage medium storing computer-executable instructions for, when executed by one or more processors, performing a method for transmitting data of a mobile terminal. The method includes: obtaining cached data of a mobile application on the mobile terminal from an uploading cache, the cached data being coded and synthesized streaming data; obtaining a cache ratio of the cached data while in an online state, the cache ratio being a ratio of the cached data to the entire uploading cache in real-time; determining whether the cache ratio exceeds a preset cache ratio threshold; adjusting a bitrate of the cached data to obtain an adjusted bitrate if it is determined that the cache ratio exceeds the preset cache ratio threshold; and transmitting the cached data to a receiving terminal according to the adjusted bitrate while in the online state with a network, so that the receiving terminal plays, according to the cached data, live content corresponding to the cached data.

Other aspects of the present disclosure can be understood by those skilled in the art in light of the description, the claims, and the drawings of the present disclosure.

BRIEF DESCRIPTION OF THE DRAWINGS

The accompanying drawings described herein are used to provide further understanding of the present disclosure, and constitute a part of this application. Illustrative embodiments and descriptions thereof of the present disclosure are used to explain the present disclosure, and do not constitute limitation to the present disclosure. In the accompanying drawings.

DESCRIPTION OF EMBODIMENTS

Figure 1:
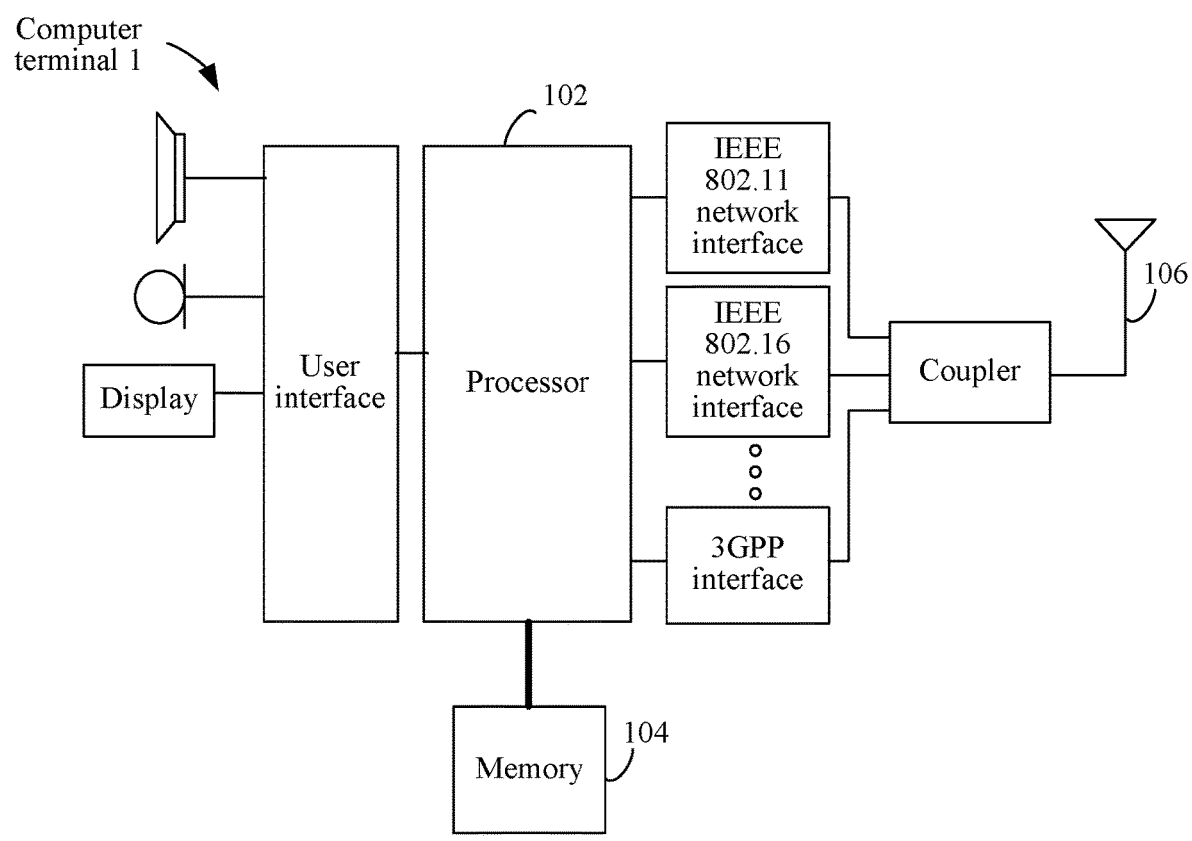
FIG. 1 is a structural block diagram of a computer terminal for transmitting data of a mobile terminal according to an embodiment of the present disclosure.

The following describes the technical solutions in the embodiments of the present disclosure with reference to the accompanying drawings. Apparently, the described embodiments are some of the embodiments of the present disclosure rather than all of the embodiments. Other embodiments obtained by a person of ordinary skill in the art based on the embodiments of the present disclosure without creative efforts shall fall within the protection scope of the present disclosure.

It should be noted that the terms such as "first" and "second" in the specification, the claims, and the foregoing accompanying drawings of the present disclosure are used to differentiate similar objects from each other, and are not necessarily used to describe a particular sequence or a time order. It should be understood that such used data can be exchanged with each other in suitable cases, so that the embodiments of the present disclosure described herein can be implemented in a sequence other than the sequences shown in the figures or described herein. Moreover, the terms "include", "have", and any variants thereof are intended to cover a to non-exclusive inclusion. For example, in the context of a process, method, system, product or device that includes a series of steps or units, the process, method, system, product or device is not necessarily limited to the clearly listed steps or units, and instead, includes other steps or units not specified clearly, or may include inherent steps or units of the process, method, product, or device.

Certain terms used in this disclosure to describe the embodiments of the present disclosure are explained in the followings.

Bitrate: with a unit of kbps (kilo-bit-per-second), indicating the amount of audio and video data per second. A larger value indicates a smaller compression rate, a higher resolution after the video image is decoded, and better quality after the audio sound is decoded. In general, a larger bitrate indicates the image and tone quality closer to that of the original audio and video. To upload the live audio and video to a network, the bitrate needs to be as low as possible, but, to locally store the audio and video, the bitrate needs to be as high as possible, so as to achieve desired corresponding quality.

Single-frame image pure audio: the video frame is fixed on a static image, without a dynamic frame sequence, while the audio is maintained, which reduce the information amount and the bitrate of the video stream to a significantly low level, and suitable for transmission in an undesired network environment.

Hardware coding: an audio and video compression processing logic unit of a mobile phone chip. A common mobile phone device has an H.264 video hardware coding logic unit for video compression coding, which is different from software coding in that the hardware coding does not occupy CPU resources of the mobile phone device.

Uploading cache: a memory area in which live data flow is stored. The data from encoded and encapsulated real-time audio and video is written into the uploading cache, and the data is read out from the uploading cache for uploading. If the speed of writing in and the speed of reading our is synchronous, the cache may always have 0 data inside, and the live uploading is in a real-time optimal state. If network uploading becomes slow, cache reading becomes slow, and the reading speed is lower than the writing speed, the cached data accumulates, the ratio is growing, and the live uploading may lose real-timeliness. Further, a data-waiting state, such as lagging or buffering, may occur at the playing client-end.

Compression coding: processing the original large data volume of the audio and video through a series of compression-coding-algorithm logic processing to generate compressed data, facilitating transmission and storage. After obtaining the compressed and encoded data, a player decodes and restores the original audio and video.

Key frame: the first frame of a video compression coding sequence group, being used to play and decode subsequent compressed frames as a reference function. Without the key frame, a decoder of a playing client-end cannot normally decode and restore a subsequent image, leading to abnormal decoded image data and an erratic display. In addition, the key frame also implements a function of dragging and positioning a video segment at a particular time point.

GOP: group of pictures, a frame sequence in which compressed video frames are packaged into one group; all image compressed frames between two key frames form one GOP.

QP: quantization parameter, a reference standard for bitrate control.

IPB frames: types of compressed frames outputted after video coding. The I frame is intra-frame coding, which is the first frame starting a GOP, and has a low compression rate, but implements the function of subsequently providing reference for coding P and B frames. The P frame is a one-way reference frame, which is used to estimate a motion vector and residual data with reference to the previous frame to perform compression. As it does not actually compress repeated pixel data of an image, the compression rate is higher than that of the I frame, but lower than that of the B frame. The B frame is two-way reference compression, which has one more direction of reference than the P frame, thus having a highest compression rate.

UGC: user generated content, a user can present or provide the user generated content to other users by using the Internet platform.

According to an embodiment of the present disclosure, a method for transmitting data of a mobile terminal is provided. It should be noted that the process shown in the flowchart of the accompanying drawing can be performed, for example, in a computer system storing a group of computer executable instructions. In addition, although a logic sequence is shown in the flowchart, in some cases, the shown or described steps may be performed in a sequence different from that described herein.

The disclosed method may be executed in a mobile terminal, a computer terminal, or a similar computing apparatus. Using an example that the method is executed in a computer terminal, FIG. 1 is a hardware block diagram of a computer terminal for a method for transmitting data of a mobile terminal.

As shown in FIG. 1, a computer terminal 1 may include at least one processor 102 (only one is shown in the figure), a memory 104 configured to store data, and a transmission module 106 configured to perform a communications function. The processor 102 may include but are not limited to processing apparatuses such as a microprocessor MCU or a programmable logical device FPGA. A person of ordinary skill in the art may understand that the structure shown in FIG. 1 is only for the purpose of illustration, and does not intend to limit the structure of the foregoing electronic apparatus. For example, the computer terminal 1 may also include more or fewer components than those shown in FIG. 1, or have a configuration different from that shown in FIG. 1.

The memory 104 may be configured to store a software program and module of application software, for example, program instructions/modules corresponding to the method for transmitting data of a mobile terminal in this embodiment of the present disclosure. The processor 102 executes the software program and module stored in the memory 104, to implement various functional applications and data processing, that is, implement the foregoing method for transmitting data of a mobile terminal. The memory 104 may include a high-speed random-access memory (RAM), and may also include a nonvolatile memory, for example, one or more magnetic storage devices, flash memories or other nonvolatile solid-state memories. In some examples, the memory 104 may further include memories remotely disposed relative to the processor 102, and these remote memories may be connected to the computer terminal 1 through a network. Examples of the network include, but are not limited to, the Internet, an intranet, a local area network, a mobile communications network, or a combination thereof.

The transmission apparatus 106 is configured to receive or send data through a network. A specific example of the foregoing network may include a wireless network provided by a communication provider of the computer terminal 1. In an example, the transmission apparatus 106 includes a network interface controller (NIC for short), which may be connected to another network device through a base station so as to perform communication with the Internet. In an embodiment, the transmission apparatus 106 may be a radio frequency (RF for short) module, which is configured to perform communication with the Internet in a wireless manner.

Figure 2:
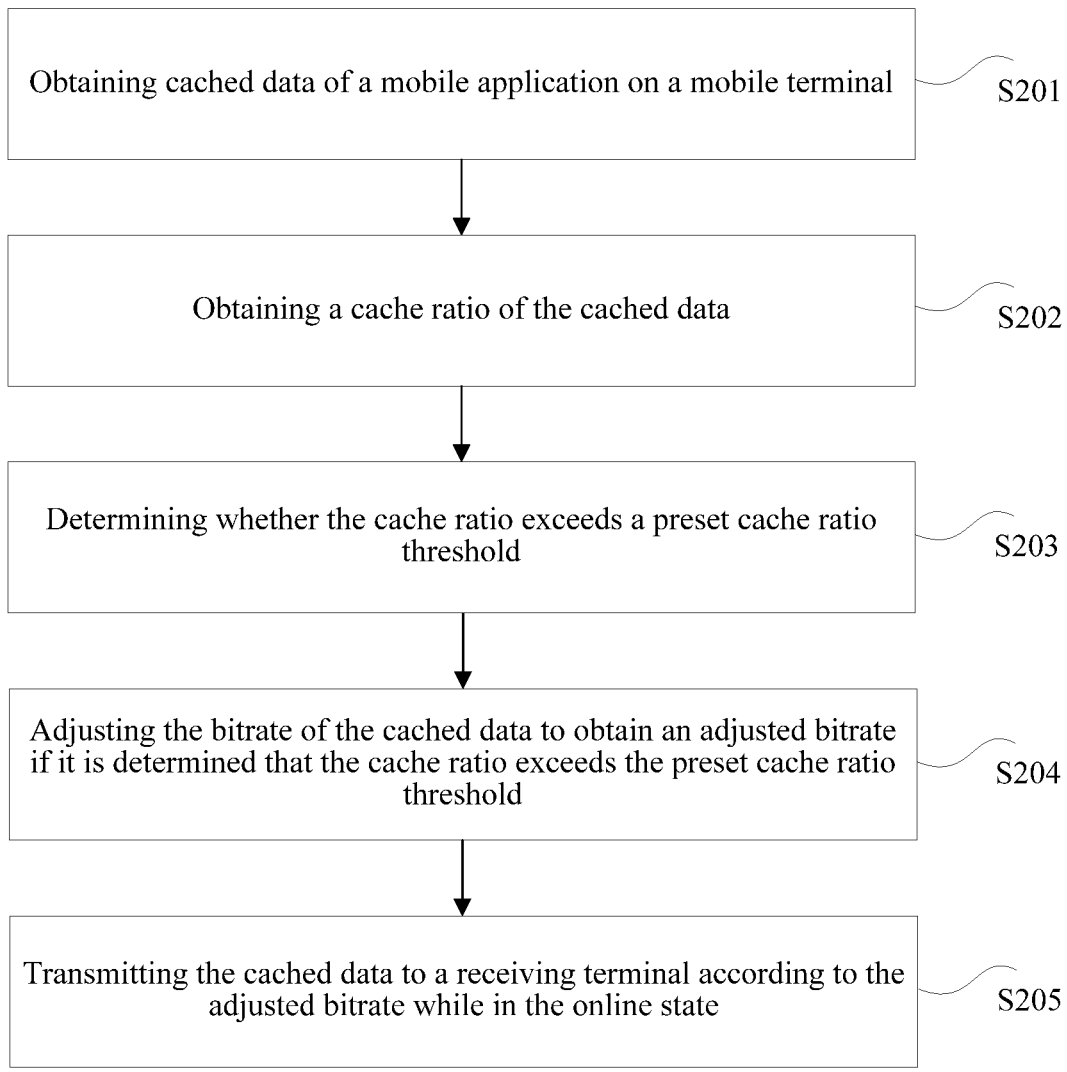
FIG. 2 is a flowchart of a method for transmitting data of a mobile terminal according to an embodiment of the present disclosure.

In the foregoing operating environment, this application provides the method for transmitting data of a mobile terminal shown in FIG. 2. The method may be applied to an intelligent terminal device, and is performed by a processor in the intelligent terminal device. The intelligent terminal device may be an intelligent mobile phone, a tablet computer, or the like. At least one application program is installed in the intelligent terminal device. This embodiment of the present disclosure does not limit the type of the application program, which may be a system application program or a software application program. The application program in this embodiment of the present disclosure includes at least one application function.

FIG. 2 is a flowchart of a method for transmitting data of a mobile terminal according to an embodiment of the present disclosure. As shown in FIG. 2, the method for transmitting data of a mobile terminal includes the followings.

S201: Obtaining cached data of a mobile application on a mobile terminal.

The mobile terminal may be an intelligent terminal such as a mobile phone or a tablet computer. The mobile application may be mobile application software installed in the mobile terminal, for example, mobile application software installed in an Android mobile phone or mobile application software installed in an iPhone. The mobile App on the mobile terminal may have collected or recorded real-time content for live broadcasting, i.e., live uploading to a network so that the live content can be received and played by one or more receiving terminals. As used herein, the mobile App or the mobile terminal may be referred as an uploading client-end, live uploading end, or uploading end, and a receiving terminal or corresponding App on the receiving terminal may be referred as playing client-end.

The cached data is coded and synthesized streaming data. The cache of a live uploading end (e.g., the uploading cache) is in a local memory of an App, and is a memory area for keeping the coded and encapsulated network flow data by the App on the live uploading end. For example, a user of user generated content (UGC) acquires image and sound data by using a camera device and a microphone device of a mobile phone, and uses a WeChat application program or a QQ application program to share, in a live manner, with other mobile terminals with other mobile applications. Other network users can play back and watch in real-time using the mobile terminals, for example, playing back and watching on tablet computers or other mobile terminals. The bottom-layer program of the mobile applications is transparent to the user, with fully intelligent and automated processing, and there is no interaction operation of a user interface (UI). When the user enters a weak network environment, the speed of reading out the cached data on the mobile phone becomes increasingly slower than the speed of writing data into the cache, affecting the fluency of playing audio and video on a receiving mobile terminal (playing client-end).

S202: Obtaining a cache ratio of the cached data.

The cache ratio, as used herein, is a ratio of real-time valid cached data to the entire allocated cache. The cache ratio reflects a measurement standard of the speed of writing the encoded data flow into the memory in real time, and the speed of reading the cached data out of the memory to upload the cached data to a server. For example, when the speed of reading out the cached data is the same as the speed of writing the cached data, the volume of the valid cached data is 0 and cache ratio is 0, and the recorded content is in a real-time optimal playing state.

In this embodiment, the cache ratio of the cached data may be obtained in many ways to represent the relationship between the speed of reading the cached data and the speed of writing the cached data. Other relationships between the speed of reading the cached data and the speed of writing the cached data may also be used, and examples are not listed herein again.

S203: Determining whether the cache ratio exceeds a preset cache ratio threshold.

After the cache ratio of the cached data is obtained in an online status, whether the obtained cache ratio exceeds the preset cache ratio threshold is determined. The preset cache ratio threshold may be multiple thresholds. The multiple thresholds respectively correspond to different network environments. In different network environments, amount of audio and video data uploaded per second may be different, that is, bitrates are different. The unit of the bitrate is kbps, and represents the amount of the audio and video data per second. For example, the preset cache ratio threshold may be multiple predetermined preset cache ratios such as 5%, 10%, 30%, 50%, and 80%, respectively corresponding to levels of the state of network, from a good state of network to a poor state of network.

S204: Adjusting the bitrate of the cached data to obtain an adjusted bitrate if it is determined that the cache ratio exceeds the preset cache ratio threshold.

After the recorded audio and video are captured and encoded, a higher bitrate of the obtained cached data indicates smaller compression on the cached data. For a video image, a larger bitrate indicates a higher similarity between the video image and an original video image, and a higher definition after the video image is decoded. For audio, a larger bitrate indicates a higher similarity between the sound quality of the audio and the sound quality of the original audio, and a better quality after the audio is decoded. To upload the live audio and video on a network, the bitrate needs to be as low as possible, while to locally store the audio and video, the bitrate needs to be as high as possible, so that the corresponding quality is as good as possible.

Similarly, a higher volume of the cached data indicates a higher requirement for the network environment in the process of writing the cached data into the memory and reading the cached data from the memory. If the bitrate of the cached data is higher but the network environment is poor, accumulation of cached data is growing, and the cache ratio reflecting the speed of writing the cached data into the memory and the speed of reading the cached data from the memory gradually increases. Thus, a data-waiting state, such as lagging or buffering, may occur at the playing client-end, and the playing of the recorded content may lose the real-timeliness of live broadcasting, affecting the user experience.

By establishing the preset cache ratio threshold, the bitrate of the cached data is adjusted according to the preset cache ratio threshold, so as to adjust the quality of audio and video data according to the network environment, thereby ensuring the fluency of playing the recorded content to a greatest extent. Adjusting the bitrate of the cached data according to the preset cache ratio threshold may include adjusting the bitrate of the cached data to be lower when the preset cache ratio is higher. For example, when the preset cache ratio is in the range of 0 to 5%, the bitrate is a target bitrate; when the preset cache ratio is in the range of 5% to 20%, the bitrate is the target bitrate×90%; when the preset cache ratio is in the range of 20% to 30%, the bitrate is the target bitrate×70%; when the preset cache ratio is in the range of 30% to 80%, the bitrate is the target bitrate×50%; when the preset cache ratio is in the range of 80% to 100%, the content is replaced with black screen pure audio. The ranges of values reflect a response speed of switching and triggering dynamic bitrate adjustment; more ranges indicate faster responses, and faster adjustment on the bitrate.

S205: Transmitting the cached data to a receiving terminal according to the adjusted bitrate while in the online state.

After the bitrate of the cached data is adjusted to obtain the adjusted bitrate, the cached data is transmitted to the receiving terminal(s) according to the adjusted bitrate. The receiving terminal is configured to play, according to the cached data, live content corresponding to the cached data. Preferably, a network situation is adapted by using a preset adjustment algorithm. When uploading of the recorded content becomes slow, a UGC live uploading end receives a prompt that the response quality decreases, and the prompt prompts the user to leave a weak network environment or replace the weak network environment with a relatively good network environment as soon as possible, so as to recover the original resolution and quality of live uploading. Each time the cache ratio exceeds the preset cache ratio threshold, the bitrate corresponding to the network environment is adopted and the user is promoted; adaptation and prompt for the bitrate is one-to-one corresponding, thereby improving the flexibility of capturing, encoding, and uploading the audio and video.

By using S201 to S205, the present disclosure may implement: obtaining cached data of a mobile application on the mobile terminal; obtaining a cache ratio of the cached data in an online state; determining whether the cache ratio exceeds a preset cache ratio threshold; adjusting the bitrate of the cached data to obtain an adjusted bitrate if it is determined that the cache ratio exceeds the preset cache ratio threshold; and transmitting the cached data to a receiving terminal according to the adjusted bitrate in the online state, so as to improve the flexibility of capturing, encoding, and uploading audio and video content, thereby resolving the technical problem in related technologies of low flexibility of capturing, encoding, and uploading audio and video data.

The cached data is mainly streaming data of compressed and synthesized audio and video data. However, currently, compressed video data is the part having the largest data volume. As an optional implementation, the process of obtaining the cached data of the mobile application on the mobile terminal may be: obtaining a compressed video frame sequence of the cached data of the mobile application. The process of adjusting the bitrate of the cached data to obtain the adjusted bitrate includes: adjusting a quantization parameter of each frame of the compressed video frame sequence to obtain an adjusted quantization parameter, and adjusting the bitrate according to the adjusted quantization parameter, so as to obtain the adjusted bitrate.

Figure 3:
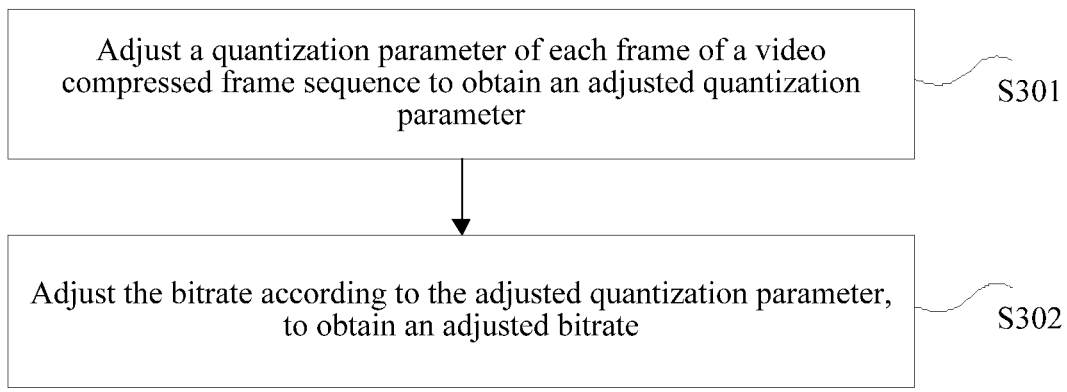
FIG. 3 is a flowchart of certain steps included in FIG. 2 according to the embodiment of the present disclosure.

As an example, S204 shown in FIG. 2 may further include steps shown in FIG. 3, including the followings.

S301: Adjusting a quantization parameter of each frame of a compressed video frame sequence to obtain an adjusted quantization parameter.

The process of obtaining the cached data of the mobile application on the mobile terminal may be obtaining the compressed video frame sequence of the cached data of the mobile application. The quantization parameter QP is a standard for controlling the bitrate of the cached data. That is, the bitrate and the network environment are adapted by adjusting the bitrate by using the quantization parameter. After the compressed video frame sequence of the cached data of the mobile application on the mobile terminal is obtained, the quantization parameter of each frame of the compressed video frame sequence is adjusted to obtain the adjusted quantization parameter.

S302: Adjusting the bitrate according to the adjusted quantization parameter to obtain the adjusted bitrate.

After the adjusted quantization parameter is obtained by adjusting the quantization parameter of each frame of the compressed video frame sequence, a bitrate of each frame of the compressed video frame sequence is further adjusted by using the adjusted quantification parameter of each frame, so as to obtain the adjusted bitrate. A higher adjusted quantization parameter indicates a higher compression rate of the data, a lower bitrate, and a higher distortion rate of the data. Further, the cached data is transmitted to the receiving terminal according to the adjusted bitrate.

As an optional implementation, S203 of determining whether the cache ratio exceeds a preset cache ratio threshold of this application includes: determining whether the cache ratio exceeds a first preset cache ratio threshold. The first preset cache ratio threshold can ensure, in real time, a desired speed of playing the live content and a desired state of network, to stabilize uploading of the cached data. Preferably, the first preset cache ratio threshold is 0%. If it is determined that the cache ratio does not exceed the preset cache ratio threshold, the bitrate of the cached data is kept. The cached data is dynamic image sequence data. Intra-frame coding of the dynamic image sequence data is different from one-way reference coding. In this case, the receiving terminal can fluently play the recorded content. The intra-frame coding of the dynamic image sequence data is performed on an I frame. The I frame is the first frame of the starting of a GOP, and has a low compression rate, but provides the functions of reference coding for subsequent P and B frames. One-way reference coding is performed on the P frame, which is used to estimate a motion vector and residual data with reference to the previous frame, but does not actually compress repeated pixel data of an image, and has a compression rate higher than that of the I frame but lower than that of the B frame. Two-way reference compression is performed on the B frame, which has one more direction of reference than the P frame, and the B frame has the highest compression rate. The GOP of this embodiment is a frame sequence in which compressed video frames are packaged into one group. All image compressed frames between two key frames are formed into one GOP. A key frame is first frame data of a video compression coding sequence group, and is used to play and decode a subsequent compressed frame, and implement a reference function. Without a key frame, a decoder of a playing client-end cannot normally decode and restore a subsequent image, leading to abnormal data of a decoded image, and erratic display. In addition, the key frame also implements a function of dragging video to a particular segment position at a particular time point.

For example, if the cache ratio exceeds the first preset cache ratio threshold, the determining whether the cache ratio exceeds a preset cache ratio threshold further includes: determining whether the cache ratio exceeds a second preset cache ratio threshold. If the speed of reading the cached data from the memory is slower than the speed of writing the cached data into the memory, the state of network is poor. As such, the network cannot normally upload the cached data according to the bitrate corresponding to the first preset cache ratio, and the cache ratio increases. Thus, it is determined whether the cache ratio exceeds the second preset cache ratio threshold. If it is determined that the cache ratio exceeds the second preset cache ratio threshold, the bitrate of the cached data is adjusted to obtain the adjusted bitrate. The cached data is the dynamic image sequence data. The intra-frame coding of the dynamic image sequence data is different from the one-way reference coding. In this case, although the recorded content can be normally played, the definition of the video decreases, and the decrease of the definition falls into an acceptable range.

For example, if the cache ratio exceeds the second preset cache ratio threshold, the determining whether the cache ratio exceeds a preset cache ratio threshold further comprises: determining whether the cache ratio exceeds a third preset cache ratio threshold. If the speed of reading the cached data from the memory is slower than the speed of writing the cached data into the memory, the state of network is very poor, and the network cannot normally upload an effective dynamic image according to the bitrate corresponding to the second preset cache ratio and to meet the requirement of the bitrate. As such, the cache ratio continues increasing, and it is determined whether the cache ratio exceeds the third preset cache ratio threshold. The third preset cache ratio threshold may be a cache ratio corresponding to adjustment of black screen pure audio. If it is determined that the cache ratio exceeds the third preset cache ratio threshold, collected original image data is replaced with still-image YUV data to obtain a bitrate corresponding to the still-image YUV data. The original image data is originally collected image data and, after replacement, the YUV data needs to be sent to an encoder and go through a series of operations such as QP quantization value adjustment, and then actual bitrate data is outputted. That is, the bitrate corresponding to the YUV data is actual bitrate data outputted after a series of operations such as bitrate adjustment and parameter quantization after YUV image data is transmitted to the encoder, for compression with the highest strength. For an input original dynamic image sequence, content of the YUV data is covered according to a frame rate. The still-image YUV data is static image sequence data, and may be single-frame image pure audio, that is, a video image is fixed on a static image, rather than a dynamic frame sequence, and audio is maintained. Thus, the information amount and the bitrate of an entire video stream are low, and the video stream is suitable for transmission and use in an undesired network environment. The width and the size of the still YUV image are kept consistent with an original sequence frame, so that the YUV image is used to replace the original image sequence with a still, uniform, and extremely high redundant black screen image with prompting text. The prompt text is used for prompting information to be known by a user on the playing client-end. The intra-frame coding of the static image sequence data is the same as the one-way reference coding.

In one embodiment, YUV is a color encoding method used by the European television system, and belongs to a PAL standard. "Y" represents luminance or luma, that is, a gray scale value; and "U" and "V" represent chrominance or chroma, whose function is to describe the color and saturation of an image for specifying the color of a pixel. "Luminance" is established by means of an RGB input signal, and is a color space used by a PAL analog color television standard. In a modern color television system, a three-tube color camera or a color CCD camera is usually used to capture an image, and then color separation and respective amplification and collection are performed on an obtained color image signal to obtain RGB, and then the RGB passes through a matrix conversion circuit to obtain a luminance signal Y and two color difference signals B-Y (that is, U) and R-Y (that is, V). Finally, a sending end separately encodes the luminance signal and the color difference signals, and sends them by using a same channel. The color representation method is YUV color space representation.

Further, the process of transmitting the cached data to a receiving terminal according to the adjusted bitrate in S205 of this application includes: transmitting a frame sequence of the still-image YUV data to the receiving terminal according to the bitrate corresponding to the still-image YUV data, where the receiving terminal plays an image corresponding to the still-image YUV data and outputs prompt information corresponding to the state of network of the third preset cache ratio threshold, for example, the prompt information of "the current state of network is very poor, please change the network environment". In one embodiment, a quantization parameter of the frame sequence of the YUV data is adjusted, such that the compression rate for the cached data is the highest, the cached data is uploaded with a relatively low coding bitrate, thereby matching the current network state to greatest extent.

After it is determined that the cache ratio exceeds the third preset cache ratio threshold, it indicates that a network condition is very poor at the moment, and video data transmission is greatly restricted. However, audio data has a relatively low requirement for the network speed. In an optional implementation, to ensure integrity of data transmission, audio data is extracted from the cached data. Thus, the process of transmitting the cached data to a receiving terminal according to the adjusted bitrate includes: transmitting the audio data to the receiving terminal, so that the receiving terminal plays audio corresponding to the audio data. Optionally, an image corresponding to the YUV data is a black screen, that is, the image corresponding to the YUV data is all black pixel points. Moreover, the amount of the audio data is relatively small. After it is determined that the cache ratio exceeds the third preset cache ratio threshold, the audio data is extracted from the cached data, the audio data is transmitted to the receiving terminal, and the receiving terminal plays the audio corresponding to the audio data, so as to replace the recorded content with black screen pure audio when the state of network is very poor, thereby improving the compression rate, and further reducing the bitrate of the volume of audio and video data to match the current bandwidth. In this way, the costs are reduced, thereby implementing live uploading of the recorded content.

In one embodiment, the black screen pure audio may use a fixed still prompt-image. A background of the prompt-image is almost all black pixels, and there are only a few prompt words for a user of the playing client-end to know the current live uploading condition. The background is a non-dynamic image sequence, and has only one image. In this way, the video compression rate can reach the bitrate of tens of kbps, i.e., the lowest limitations, without a feeling of distortion. The image frame compression rate becomes substantially high, and the bitrate may decrease to the minimum. When the dynamic video sequence charges abruptly, on the contrary, a larger bitrate is needed to maintain the original information amount to prevent loss of the information, i.e., to prevent dropping when the network experiences jitter and poor quality and cannot meet the requirement of the current bitrate, some coded data frames are dropped to reduce the data volume of the bitrate, causing the problem of loss of original image compressed content, decrease of the frame rate, decrease of fluency, and reduction of the amount of content information.

Figure 4:
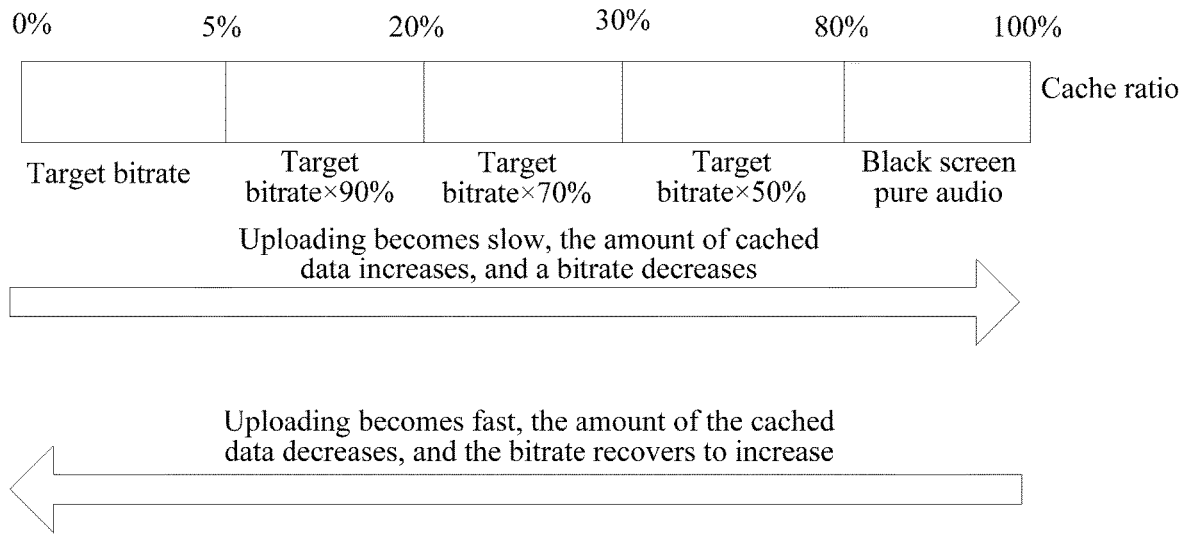
FIG. 4 is a schematic diagram of a relationship between a cache ratio and a bitrate of a mobile terminal according to an embodiment of the present disclosure.

FIG. 4 is a schematic diagram of a relationship between a cache ratio and a bitrate of a mobile terminal according to an embodiment of the present disclosure. As shown in FIG. 4, when a cache ratio of uploaded data ranges between 0 and 5%, the bitrate is not adjusted; when the cache ratio ranges between 5% to 20%, the bitrate is adjusted to 90% of the target bitrate; when the cache ratio ranges between 20% to 30%, the bitrate is adjusted to 70% of the target bitrate; when the cache ratio ranges between 30% to 80%, the bitrate is adjusted to 50% of the target bitrate; when the cache ratio ranges between 80% to 100%, the audio data is transmitted to a receiving terminal, and is played by using black screen pure audio.

That is, as the state of network becomes poorer, the speed of uploading cached data becomes slow, and the amount of unread cached data increases. Thus, the uploading cache ratio of the cached data of a mobile application on the mobile terminal increases, and the bitrate is separately adjusted to 90%, 70%, and 50% of the target bitrate. When the cache ratio is excessively high, the cached data is transmitted by using black screen pure audio. When the network condition gradually becomes better, with the decrease of the cache ratio, the speed of uploading the cached data becomes fast, and the amount of the unread cached data decreases, and the bitrate is gradually increased to the target bitrate, thereby improving the quality of audio and video data.

In one embodiment of the present disclosure, storage of the cached data may be storing encapsulated real-time audio and video streaming data, which may be extended to just cached data outputted by video coding or other cached data. In embodiments of the present disclosure, the ratio ranges and the degree or percentage in which the original target bitrate is dynamically adjusted can be dynamically configured at the backend according to an actual situation. In this embodiment, only some examples are listed. A person skilled in the art should understand that this is not used as limitation to the present disclosure. For example, more preset cache ratios may be set according to actual requirement. Therefore, there are more different ranges of the cache ratio. The number of the ranges reflect the response speed of switching and triggering dynamic bitrate adjustment; more compact ranges or intervals indicate faster responses, and faster adjustment on the bitrate.

Figure 5:
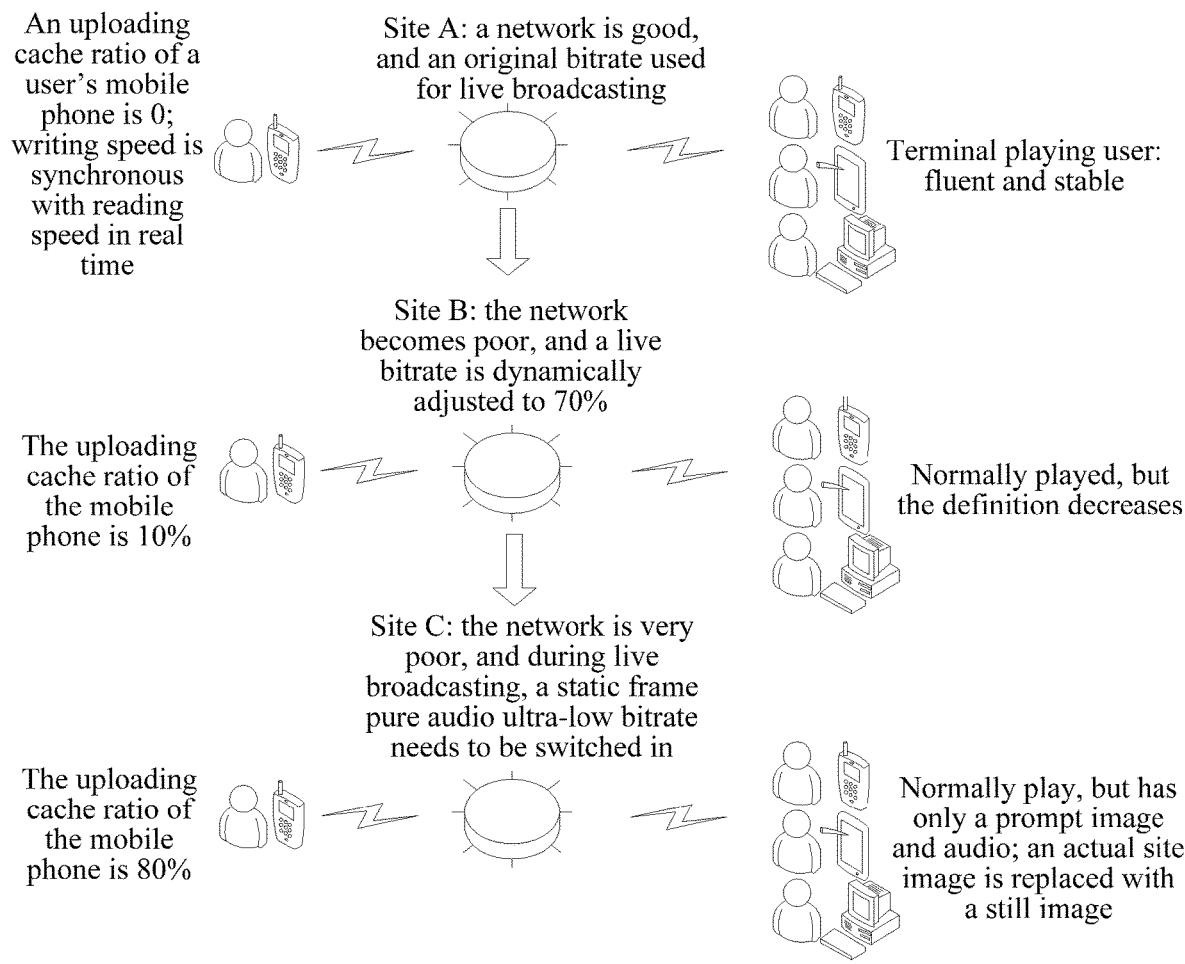
FIG. 5 is a schematic diagram of uploading cache of a user mobile phone changes as the network state changes and playing condition of a terminal user according to an embodiment of the present disclosure.

FIG. 5 is a schematic diagram of a live uploading cache change on a user's mobile phone and the playing status of a receiving terminal with changing network environment according to an embodiment of the present disclosure. As shown in FIG. 5, the network condition in site A is relatively good. The uploading cache ratio of the user's mobile phone is 0. Writing is synchronous with reading in real time. The target bitrate is an original bitrate and adjustment is not needed. The display seen by users of the receiving terminals is fluent and stable. The network condition in site B becomes poor. The uploading cache ratio of the user's mobile phone is 10%. The cache uploading and reading speed is slower than the speed of real-time coding and writing. The live uploading bitrate is adjusted to 70% of the target bitrate. The images can be normally played on the receiving terminals, but the definition decreases. The network condition in site C is very poor. The uploading cache ratio of the user's mobile phone is 80%. The cache uploading and reading speed is far slower than the speed of real-time coding and writing. During live uploading, a static frame pure audio ultra-low bitrate needs to be switched. The receiving terminals can normally play, but only a prompt image and audio, with the actual images replaced with a switchover still image.

Figure 6A:
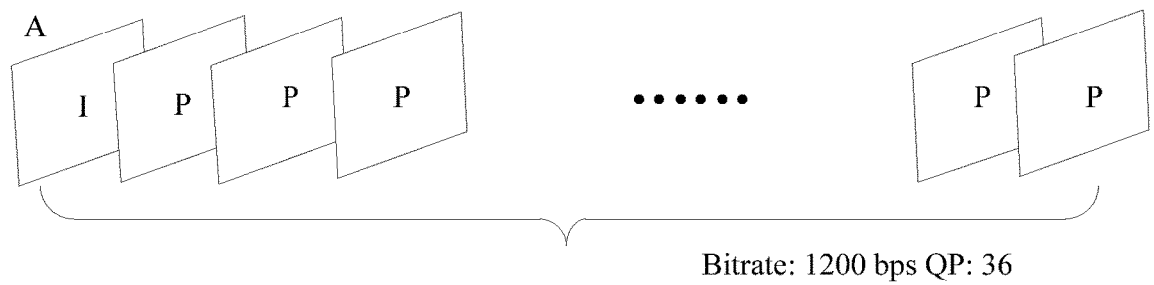
FIG. 6A to FIG. 6C are schematic diagrams of transmission of I frames and P frames of a video according to an embodiment of the present disclosure.

Cached data is mainly synthesized compressed audio and video streaming data. However, currently, compressed video data is a main part having the largest data volume. FIG. 6A is a schematic diagram of transmission of an I frame and P frames of a video according to an embodiment of the present disclosure. As shown in FIG. 6A, in this embodiment, by using a video sequence with a video resolution of 1280×720, and the number of transmitted frames per second of 25 fps as an example, when the bitrate is 1200 kbps, and an average quantization parameter QP is 36, input images corresponding to the I frame and the P frames of the dynamic image sequence are different. At moment A of a second of compressed video frame sequence, uploading is stable, and a cache ratio is 0%, so that the speed of playing a live stream can be ensured in real time.

Figure 6B:
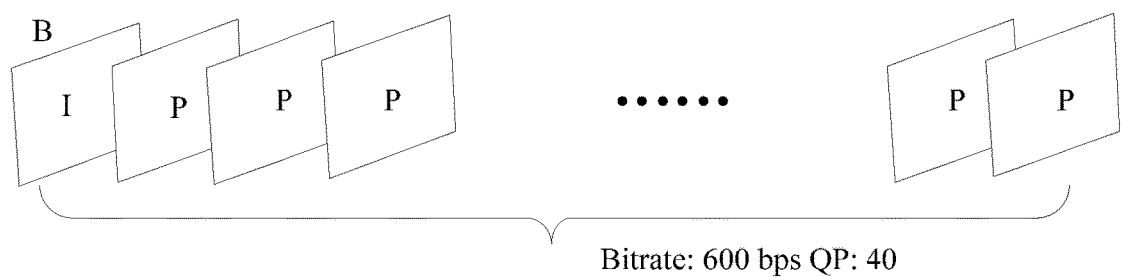

FIG. 6B is a schematic diagram of transmission of an I frame and P frames of a video according to this embodiment of the present disclosure. As shown in FIG. 6B, in this embodiment, a bitrate at moment B is 600 kbps, and an average QP is 40, input images corresponding to the I frame and the P frames of a dynamic image sequence are different. At moment B of a second of compressed video frame sequence, because the state of network becomes poor at the moment, during network uploading, the bitrate of 1200 kbps cannot be transmitted at a normal speed, and an uploading cache ratio increases. When the increasing cache ratio triggers bitrate adjustment, the bitrate is adjusted. That is, the QP quantization parameter of each frame of video coding is adjusted to implement the bitrate adaptation. Although the definition decreases, a better stability and fluency of playing audio and videos can be ensured. The audio and video quality falls into an acceptable range.

Figure 6C:
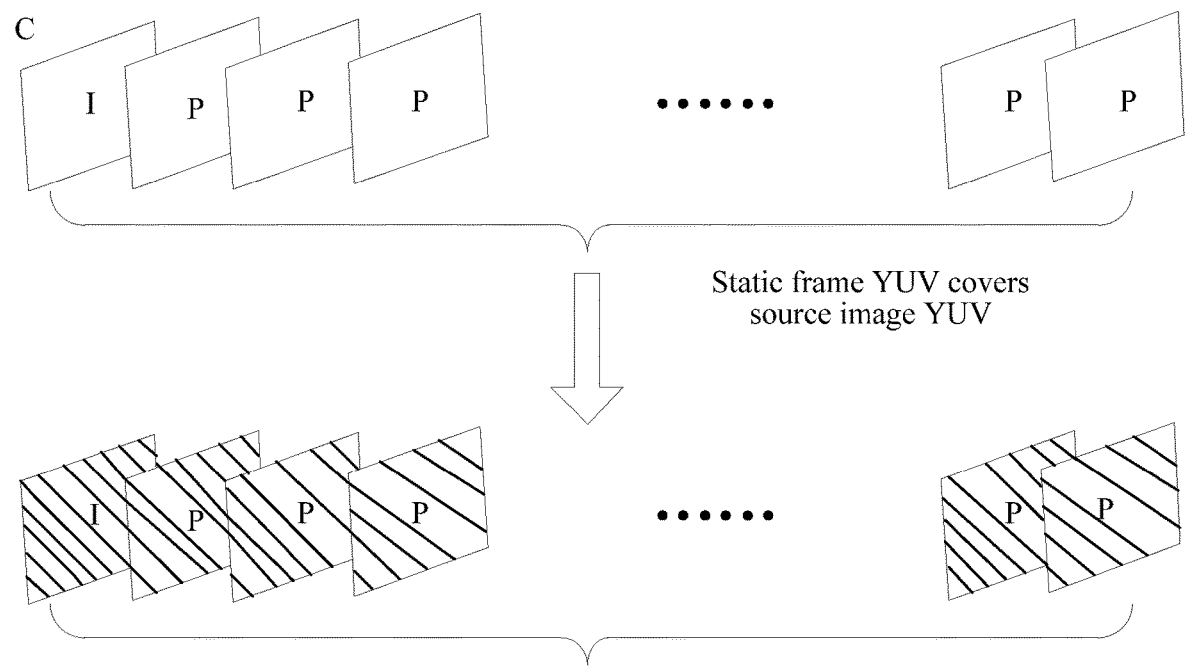

FIG. 6C is a schematic diagram of transmission of an I frame and P frames of a video according to this embodiment of the present disclosure. As shown in FIG. 6C, in this embodiment, the bitrate at moment C is 50 kbps, and an average QP is 55, input images corresponding to the I frame and the P frames of a static image sequence are the same. At moment C of a second of compressed video frame sequence, because the current state of network is very poor, during network uploading, a bitrate required for an effective dynamic image sequence cannot be normally transmitted. An uploading cache threshold has been triggered to a black screen pure audio adjustment policy. For an input original dynamic image sequence, content of YUV data is included according to a frame rate. The width and the size of the still YUV image are kept consistent with an original sequence frame, so that the YUV image is used to replace the original image sequence with a still, uniform, and extremely high redundant black screen image with prompting text. The prompt text is used for prompting information to be known by a user on the playing client-end. Further, the QP adjustment is performed by using the new frame sequence. The frame sequence has a relatively high compression rate, and is outputted by coding with a relatively low bitrate, thereby matching the uploading of the current state of network to greatest extent.

When a network environment gradually becomes better, the uploading cache ratio gradually decreases and reversely triggers and increases the bitrate threshold again, the bitrate is reversely adjusted, to recover an effective image video.

According to the embodiments of the present disclosure, by obtaining a cache ratio of cached data in an online status, adjusting a bitrate of the cached data to obtain an adjusted bitrate when it is determined that the cache ratio exceeds a preset cache ratio threshold, and transmitting the cached data to a receiving terminal according to the adjusted bitrate, the technical problem in related technologies that the flexibility of capturing, encoding, and uploading audio and a video is low is resolved. This can ensure the live watching experience of a user on the receiving terminal, and ensuring, in priority, that live content with good quality, of great significance, and attracting high attention is normally, stably, and fluently transmitted and presented to the user, thereby achieving maximum real-time performance and fidelity. In addition, there is no extra requirements on operation for servers. The low-coupling structure does not have a series of uncontrollable risks brought by frequently re-starting a background server program and triggering a playing logic of a playing client-end due to slow uploading and intermittent live streams, and even disconnection and reconnection.

According to the embodiments of the present disclosure, the effect of decreasing a bitrate is achieved by performing QP operation based adjustment on the bitrate and inserting a still and unitary repeated frame with high redundancy. However, due to limitation of hardware, only an I frame and a P frame both having a low compression rate are used in a current solution for coding output, and a B frame having a highest compression rate is not introduced. With the progress of devices, software and hardware, and optimization technologies, a mobile terminal can use a B frame for coding in a computer, so as to further improve the compression rate and reduce the bitrate, thereby improving the picture quality of a video when the bitrate is not changed. Because a mobile device is restricted by machine firmware and performance, a central processing unit (CPU for short) is greatly consumed in spite of a good software coding quality compression rate, leading to heat emission of the device and power consumption. Moreover, an output definition thereof is limited, leading to greatly reduced definition and frame rate fluency. By using an IOS device iPhone 6 as an example, for a video sequence having a definition of 1280×720 P, coding can output only a number of transmitted frames per second of 15 fps, and only an I frame and a P frame are included, and B frame high compression coding cannot be used. In this way, it is relatively difficult to output best video picture quality while ensuring the fluent experience to a greatest extent in a weak network or an unstable network. Currently, hardware coding is an audio and video compression processing logic unit of a mobile phone chip. A common mobile phone device has an H.264 video hardware coding logic unit for video compression coding. Different from a software coding, hardware coding does not occupy CPU resources of the device. The hardware coding breaks through a bottleneck limitation of software coding on coding performance. However, hardware coding is not mature enough at present. Algorithms with high complexity and flexibility are no match for mature software coding. After devices having CPUs and GPU chip technologies are developed mature in the future, hardware coding can completely achieve performance quality and high compression rate the same as those of software coding, so as to provide guarantee for applications related to video real-time coding of a mobile device and network transmission. In addition, acceleration of a network environment has a profound impact on the field and technology. Further upgrading of a mobile operator network, construction of a base station, and access stability will greatly benefit from mobile video live uploading applications, improving the flexibility of capturing, encoding, and uploading audio and video.

It should be noted that, for the foregoing various method embodiments, for ease of description, the method embodiments are all expressed into a series of action combinations. However, a person skilled in the art should know that the present disclosure is not limited by a sequence of described actions because some steps may use other sequences or may be simultaneously performed according to the present disclosure. Secondly, a person skilled in the art should also know that the embodiments described in the specification are all preferred embodiments, and actions and modules involved in the embodiments are not necessarily needed by the present disclosure.

By means of the description of the foregoing implementations, a person skilled in the art can clearly learn that the methods according to the foregoing embodiments may be implemented by means of software and necessary hardware platforms, and certainly, may also be implemented by hardware. Based on such an understanding, the technical solutions of the present disclosure may be implemented in a form of a software product. The computer software product is stored in a storage medium, such as a read-only memory (ROM for short)/random access memory (RAM for short), a magnetic disk, or an optical disc, and includes several instructions for instructing a computer device (which may be a mobile phone, a computer, a server, a network device, or the like) to perform methods described in the embodiments of the present disclosure.

Figure 7:
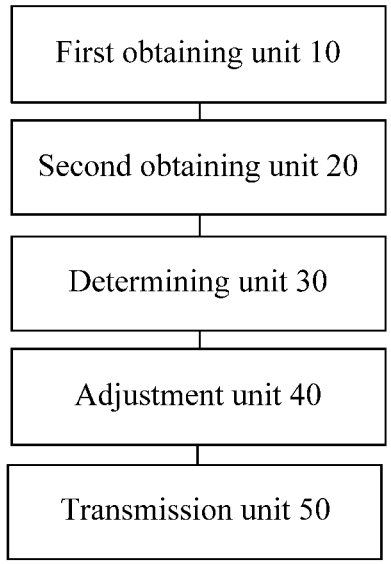
FIG. 7 is a schematic diagram of an apparatus for transmitting data of a mobile terminal according to an embodiment of the present disclosure.

According to an embodiment of the present disclosure, an apparatus configured to implement the foregoing method for transmitting data of a mobile terminal is further provided. FIG. 7 is a schematic diagram of an apparatus for transmitting data of a mobile terminal according to an embodiment of the present disclosure. As shown in FIG. 7, the apparatus includes: a first obtaining unit 10, a second obtaining unit 20, a determining unit 30, an adjustment unit 40, and a transmission unit 50.

The first obtaining unit 10 is configured to obtain cached data of a mobile application on the mobile terminal, the cached data being coded and synthesized streaming data.

The second obtaining unit 20 is configured to obtain a cache ratio of the cached data, the cache ratio being a ratio of a size of real-time valid cached data to a size of an entire distributed cache. The cache ratio reflects a measurement standard of the speed of writing the encoded data flow into the memory in real time, and the speed of reading the cached data out of the memory to upload the cached data to a server.

The determining unit 30 is configured to determine whether the cache ratio exceeds a preset cache ratio threshold.

The adjustment unit 40 is configured to adjust a bitrate of the cached data to obtain an adjusted bitrate if it is determined that the cache ratio exceeds the preset cache ratio threshold.

The transmission unit 50 is configured to transmit the cached data to a receiving terminal according to the adjusted bitrate in an online status, so that the receiving terminal plays, according to the cached data, live content corresponding to the cached data.

In the apparatus for transmitting data of a mobile terminal in this embodiment, the first obtaining unit 10 may be configured to perform S201 shown in FIG. 2; the second obtaining unit 20 may be configured to perform S202 shown in FIG. 2; the determining unit 30 may be configured to perform S203 shown in FIG. 2; the adjustment unit 40 is configured to perform S204 shown in FIG. 2; the transmission unit 50 may be configured to perform S205 shown in FIG. 2. Refer to the foregoing descriptions for the data transmission method for specific operations of these units.

Figure 8:
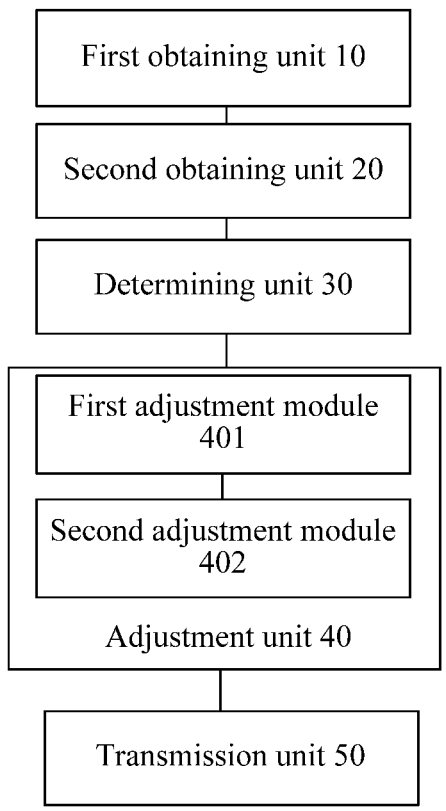
FIG. 8 is a schematic diagram of another apparatus for transmitting data of a mobile terminal according to an embodiment of the present disclosure.

As an optional embodiment, FIG. 8 is a schematic diagram of an apparatus for transmitting data of a mobile terminal according to another embodiment of the present disclosure. As shown in FIG. 8, the apparatus includes: a first obtaining unit 10, a second obtaining unit 20, a determining unit 30, an adjustment unit 40, and a transmission unit 50. The adjustment unit 40 includes a first adjustment module 401 and a second adjustment module 402.

The functions of the first obtaining unit 10, the second obtaining unit 20, the determining unit 30, the adjustment unit 40, and the transmission unit 50 in this embodiment are the same as the functions in the apparatus for transmitting data in a mobile terminal described with reference to FIG. 7.

The first adjustment module 401 is configured to adjust a quantization parameter of each frame of a compressed video frame sequence to obtain an adjusted quantization parameter, the quantization parameter being a standard for controlling the bitrate of cached data.

The second adjustment module 402 is configured to adjust the bitrate according to the adjusted quantization parameter to obtain an adjusted bitrate.

The first adjustment module 401 and the second adjustment module 402 herein are configured to perform operations respectively corresponding to S301 and S302 shown in FIG. 3, and detailed description is not provided herein.

Optionally, the determining unit 30 is configured to determine whether a cache ratio exceeds a first preset cache ratio threshold, and the adjustment unit 40 is configured to keep the bitrate of the cached data if it is determined that the cache ratio does not exceed the first preset cache ratio threshold, the cached data being dynamic image sequence data. Intra-frame coding of the dynamic image sequence data is different from one-way reference coding.

Optionally, when the determining unit 30 determines that the cache ratio exceeds the first preset cache ratio threshold, the determining unit 30 is further configured to determine whether the cache ratio exceeds a second preset cache ratio threshold. When the cache ratio exceeds the second preset cache ratio threshold, the adjustment unit 40 is configured to adjust the bitrate of the cached data to obtain the adjusted bitrate, the cached data being the dynamic image sequence data. The Intra-frame coding of the dynamic image sequence data is different from the one-way reference coding.

Optionally, when the determining unit 30 determines that the cache ratio exceeds the second preset cache ratio threshold, the determining unit 30 is further configured to determine whether the cache ratio exceeds a third preset cache ratio threshold. When the cache ratio exceeds the third preset cache ratio threshold, the adjustment unit 40 replaces original image data with still YUV data to obtain a bitrate corresponding to the still YUV data. The bitrate corresponding to the YUV data is actual bitrate data output after a series of operations such as bitrate adjustment and parameter quantization after YUV image data is transmitted to an encoder. The still YUV data is static image sequence data. Intra-frame coding of the static image sequence data is the same as the one-way reference coding. The transmission unit is configured to transmit a frame sequence of the still YUV data to a receiving terminal according to the bitrate corresponding to the still YUV data. The receiving terminal plays an image corresponding to the still YUV data and outputs prompt information corresponding to the state of network of the third preset cache ratio threshold.

Figure 9:
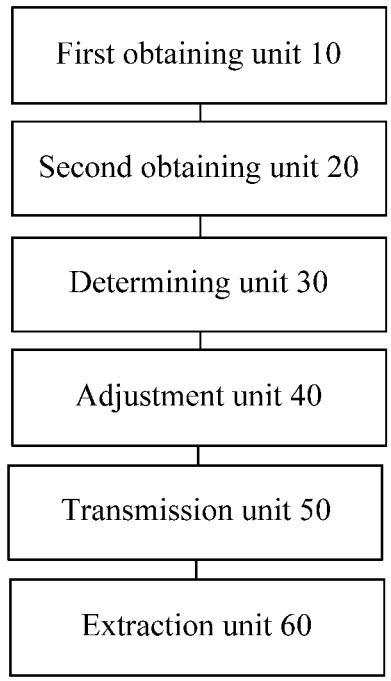
FIG. 9 is a schematic diagram of another apparatus for transmitting data of a mobile terminal according to an embodiment of the present disclosure.

As an optional embodiment, FIG. 9 is a schematic diagram of an apparatus for transmitting data of a mobile terminal according to still another embodiment of the present disclosure. As shown in FIG. 9, the apparatus not only includes the units shown in FIG. 8, but also includes an extraction unit 60. The extraction unit 60 is configured to extract audio data from cached data after it is determined that a cache ratio exceeds the third preset cache ratio threshold. The transmission unit 50 is configured to transmit the audio data to a receiving terminal. The receiving terminal plays audio corresponding to the audio data.

An embodiment of the present disclosure further provides a storage medium. Optionally, in this embodiment, the foregoing storage medium may be configured to store program code executed by a processor to implement the method for transmitting data of a mobile terminal in the foregoing embodiments.

Optionally, in this embodiment, the foregoing storage medium may be located in at least one network device of multiple network devices of a computer network.

Optionally, in this embodiment, the foregoing storage medium may include but is not limited to: any medium that can store a program code, such as a USB flash drive, an ROM, an RAM, a removable hard disk, a magnetic disk, or an optical disc.

An embodiment of the present disclosure further provides a computer terminal, which may be any computer terminal device in a computer terminal group. Optionally, in this embodiment, the foregoing computer terminal may alternatively be replaced as a terminal device such as a mobile terminal.

Optionally, in this embodiment, the foregoing computer terminal may be located in at least one network device of multiple network devices of a computer network.

Figure 10:
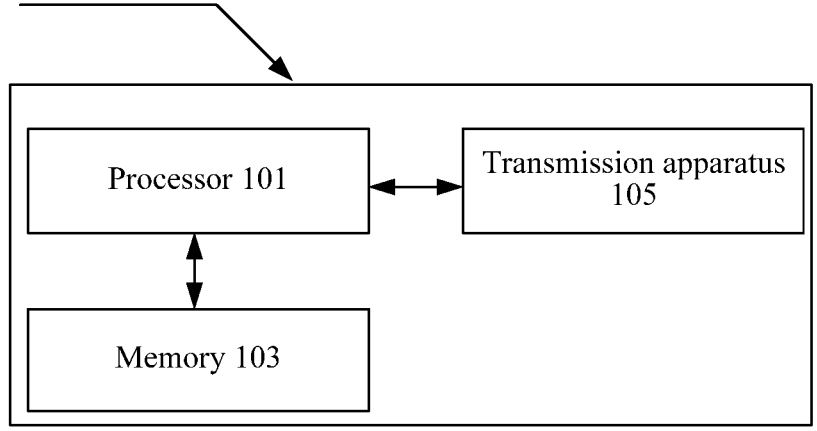
FIG. 10 is a structural block diagram of a computer terminal according to an embodiment of the present disclosure.

Optionally, FIG. 10 is a structural block diagram of a computer terminal according to an embodiment of the present disclosure. As shown in FIG. 10, the computer terminal A may include: one or more (only one is shown in the figure) processors 101, a memory 103, and a transmission apparatus 105.

The memory 103 may be configured to store a software program and module, for example, program instructions/modules corresponding to the method and apparatus for transmitting data of a mobile terminal in the embodiments of the present disclosure. The processor 101 runs the software program and module stored in the memory 103, to implement various functional applications and data processing, that is, implement the foregoing method for transmitting data of a mobile terminal. The memory 103 may include a high-speed random-access memory, and may also include a nonvolatile memory, for example, one or more magnetic storage devices, flash memories or other nonvolatile solid-state memories. In some embodiments, the memory 103 may further include memories remotely disposed relative to the processor 101, and these remote memories may be connected to the computer terminal A through a network. Examples of the network include, but are not limited to, the Internet, an intranet, a local area network, a mobile communications network, or a combination thereof.

The foregoing transmission apparatus 105 is configured to receive or send data through a network. Specific examples of the foregoing network include a wired network and a wireless network. In an example, the transmission apparatus 105 includes an NIC, which may be connected to another network device and a router through a cable so as to perform communication with the Internet or a local area network. In an example, the transmission apparatus 105 is an RF module, which is configured to perform communication with the Internet in a wireless manner.

Specifically, the memory 103 is configured to store information about a user of a preset action condition and a preset permission, and an application program, such as a mobile application.

The processor 101 may invoke, by using the transmission apparatus, the information and the application program that are stored in the memory 103, to perform the various methods previously described, for example, including the followings.

Obtaining cached data of a mobile application on a mobile terminal, the cached data being coded and synthesized streaming data.

Obtaining a cache ratio of the cached data, the cache ratio being a ratio of real-time valid cached data to the entire allocated cache. The cache ratio reflects a measurement standard of the speed of writing the encoded data flow into the memory in real time, and the speed of reading the cached data out of the memory to upload the cached data to a server.

Determining whether the cache ratio exceeds a preset cache ratio threshold.

Adjusting a bitrate of the cached data to obtain an adjusted bitrate if it is determined that the cache ratio exceeds the preset cache ratio threshold.

Transmitting the cached data to a receiving terminal according to the adjusted bitrate in an online status, where the receiving terminal is configured to play, according to the cached data, live content corresponding to the cached data.

As an example, the processor described herein may perform the steps described in the embodiments of the data transmission method, as previously described in FIG. 2 and FIG. 3. For briefness, detailed description is not provided herein again.

In the several embodiments provided in the present application, it should be understood that the disclosed terminals or client-end may be implemented in other manners. The described apparatus embodiments are merely exemplary. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the units or modules may be implemented in electronic or other forms.

The units described as separate parts may or may not be physically separate, and the parts displayed as units may or may not be physical units, may be located in one position, or may be distributed on multiple network units. A part of or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit. The integrated unit may be implemented in the form of hardware, or may be implemented in the form of a software functional unit.

The foregoing descriptions are merely certain implementations of present disclosure. It should be pointed out that a person of ordinary skill in the art may further make improvement and modification without departing from the principle of the present disclosure. The improvement and modification should also be considered to fall within the protection scope of the present disclosure.

What is claimed is:

1. A method for transmitting data of a mobile terminal, comprising:
    obtaining cached data of a mobile application on the mobile terminal from an uploading cache, the cached data being coded and synthesized streaming data;
    obtaining a cache ratio of the cached data while in an online state, the cache ratio being a ratio of the cached data to the entire uploading cache in real-time;
    determining whether the cache ratio exceeds a preset cache ratio threshold;
    adjusting a bitrate of the cached data to obtain an adjusted bitrate if it is determined that the cache ratio exceeds the preset cache ratio threshold, wherein the bitrate of the cached data indicates an amount of video data in each second of the cached data, and a higher cache ratio corresponds to a lower adjusted bitrate; and
    transmitting the cached data to a receiving terminal according to the adjusted bitrate while in the online state with a network, so that the receiving terminal plays, according to the cached data, live content corresponding to the cached data,
    wherein:
    the cached data comprises a compressed video frame sequence, and
    adjusting the bitrate of the cached data comprises:
        adjusting a quantization parameter of each frame of the compressed video frame sequence to obtain an adjusted quantization parameter, the quantization parameter being a standard for controlling the bitrate of the cached data; and
        adjusting the bitrate according to the adjusted quantization parameter to obtain the adjusted bitrate.

2. The method according to claim 1, wherein the determining whether the cache ratio exceeds a preset cache ratio threshold comprises:
    determining whether the cache ratio exceeds a first preset cache ratio threshold, and
    wherein the adjusting the bitrate of the cached data further comprises:
    keeping the bitrate of the cached data without adjustment if it is determined that the cache ratio does not exceed the first preset cache ratio threshold.

3. The method according to claim 2, wherein the determining whether the cache ratio exceeds a preset cache ratio threshold further comprises:
    determining whether the cache ratio exceeds a second preset cache ratio threshold if it is determined that the cache ratio exceeds the first preset cache ratio threshold; and
    wherein the adjusting the bitrate of the cached data further comprises:
    adjusting the bitrate of the cached data to obtain the adjusted bitrate based on the cache ratio if it is determined that the cache ratio exceeds the second preset cache ratio threshold.

4. The method according to claim 3, wherein the determining whether the cache ratio exceeds a preset cache ratio threshold further comprises:
    determining whether the cache ratio exceeds a third preset cache ratio threshold if it is determined that the cache ratio exceeds the second preset cache ratio threshold;
    wherein the adjusting the bitrate of the cached data further comprises:
    replacing the cached data with still-image YUV data to obtain a bitrate corresponding to the still-image YUV data, the still-image YUV data being static image sequence data if it is determined that the cache ratio exceeds the third preset cache ratio threshold; and
    the transmitting the cached data to a receiving terminal according to the adjusted bitrate comprises:
    transmitting a frame sequence of the still-image YUV data to the receiving terminal according to the bitrate corresponding to the still-image YUV data, wherein the receiving terminal plays an image corresponding to the still-image YUV data and outputs prompt information corresponding to an undesired state of the network.

5. The method according to claim 4, after determining that the cache ratio exceeds the third preset cache ratio threshold, the method further comprising:
    extracting audio data from the cached data,
    wherein the transmitting the cached data to a receiving terminal according to the adjusted bitrate further comprises:
    transmitting the audio data to the receiving terminal, so that the receiving terminal plays audio corresponding to the audio data while display the image corresponding to the still-image YUV data and the prompt information.

6. An apparatus for transmitting data of a mobile terminal, comprising:
    a memory storing instructions; and
    a processor coupled to the memory and, when executing the instructions, configured for:
        obtaining cached data of a mobile application on the mobile terminal from an uploading cache, the cached data being coded and synthesized streaming data;
        obtaining a cache ratio of the cached data while in an online state, the cache ratio being a ratio of the cached data to the entire uploading cache in real-time;
        determining whether the cache ratio exceeds a preset cache ratio threshold;
        adjusting a bitrate of the cached data to obtain an adjusted bitrate if it is determined that the cache ratio exceeds the preset cache ratio threshold, wherein the bitrate of the cached data indicates an amount of video data in each second of the cached data, and a higher cache ratio corresponds to a lower adjusted bitrate; and transmitting the cached data to a receiving terminal according to the adjusted bitrate while in the online state with a network, so that the receiving terminal plays, according to the cached data, live content corresponding to the cached data, wherein:

the cached data comprises a compressed video frame sequence, and adjusting the bitrate of the cached data comprises:
   adjusting a quantization parameter of each frame of the compressed video frame sequence to obtain an adjusted quantization parameter, the quantization parameter being a standard for controlling the bitrate of the cached data; and
   adjusting the bitrate according to the adjusted quantization parameter to obtain the adjusted bitrate.

7. The apparatus according to claim 6, wherein:

for determining whether the cache ratio exceeds a preset cache ratio threshold, the processor is configured for determining whether the cache ratio exceeds a first preset cache ratio threshold, and for adjusting the bitrate of the cached data, the processor is configured for, keeping the bitrate of the cached data without adjustment if it is determined that the cache ratio does not exceed the first preset cache ratio threshold.

8. The apparatus according to claim 7, wherein:

for determining whether the cache ratio exceeds a preset cache ratio threshold, the processor is configured for, determining whether the cache ratio exceeds a second preset cache ratio threshold if it is determined that the cache ratio exceeds the first preset cache ratio threshold; and for adjusting the bitrate of the cached data, the processor is configured for, adjusting the bitrate of the cached data to obtain the adjusted bitrate based on the cache ratio if it is determined that the cache ratio exceeds the second preset cache ratio threshold.

9. The apparatus according to claim 8, wherein:

for determining whether the cache ratio exceeds a preset cache ratio threshold, the processor is configured for, determining whether the cache ratio exceeds a third preset cache ratio threshold if it is determined that the cache ratio exceeds the second preset cache ratio threshold;

for adjusting the bitrate of the cached data, the processor is configured for, replacing the cached data with still-image YUV data to obtain a bitrate corresponding to the still-image YUV data, the still-image YUV data being static image sequence data if it is determined that the cache ratio exceeds the third preset cache ratio threshold; and for transmitting the cached data to a receiving terminal according to the adjusted bitrate the processor is configured for transmitting a frame sequence of the still-image YUV data to the receiving terminal according to the bitrate corresponding to the still-image YUV data, wherein the receiving terminal plays an image corresponding to the still-image YUV data and outputs prompt information corresponding to an undesired state of the network.

10. The apparatus according to claim 9, after determining that the cache ratio exceeds the third preset cache ratio threshold, the processor is further configured for:
   extracting audio data from the cached data; and
   transmitting the audio data to the receiving terminal, so that the receiving terminal plays audio corresponding to the audio data while display the image corresponding to the still-image YUV data and the prompt information.

11. A non-transitory computer-readable storage medium containing computer-executable instructions for, when executed by one or more processors, performing a method for transmitting data of a mobile terminal, the method comprising:
   obtaining cached data of a mobile application on the mobile terminal from an uploading cache, the cached data being coded and synthesized streaming data;
   obtaining a cache ratio of the cached data while in an online state, the cache ratio being a ratio of the cached data to the entire uploading cache in real-time;
   determining whether the cache ratio exceeds a preset cache ratio threshold;
   adjusting a bitrate of the cached data to obtain an adjusted bitrate if it is determined that the cache ratio exceeds the preset cache ratio threshold, wherein the bitrate of the cached data indicates an amount of video data in each second of the cached data, and a higher cache ratio corresponds to a lower adjusted bitrate; and
   transmitting the cached data to a receiving terminal according to the adjusted bitrate while in the online state with a network, so that the receiving terminal plays, according to the cached data, live content corresponding to the cached data, wherein:

the cached data comprises a compressed video frame sequence, and adjusting the bitrate of the cached data comprises:
   adjusting a quantization parameter of each frame of the compressed video frame sequence to obtain an adjusted quantization parameter, the quantization parameter being a standard for controlling the bitrate of the cached data; and
   adjusting the bitrate according to the adjusted quantization parameter to obtain the adjusted bitrate.

12. The non-transitory computer-readable storage medium according to claim 11, wherein the determining whether the cache ratio exceeds a preset cache ratio threshold comprises:
   determining whether the cache ratio exceeds a first preset cache ratio threshold, and
   wherein the adjusting the bitrate of the cached data further comprises:
   keeping the bitrate of the cached data without adjustment if it is determined that the cache ratio does not exceed the first preset cache ratio threshold.

13. The non-transitory computer-readable storage medium according to claim 12, wherein the determining whether the cache ratio exceeds a preset cache ratio threshold further comprises:
   determining whether the cache ratio exceeds a second preset cache ratio threshold if it is determined that the cache ratio exceeds the first preset cache ratio threshold; and
   wherein the adjusting the bitrate of the cached data further comprises:

adjusting the bitrate of the cached data to obtain the adjusted bitrate based on the cache ratio if it is determined that the cache ratio exceeds the second preset cache ratio threshold.

14. The non-transitory computer-readable storage medium according to claim 13, wherein the determining whether the cache ratio exceeds a preset cache ratio threshold further comprises:
   determining whether the cache ratio exceeds a third preset cache ratio threshold if it is determined that the cache ratio exceeds the second preset cache ratio threshold;
   wherein the adjusting the bitrate of the cached data further comprises:
   replacing the cached data with still-image YUV data to obtain a bitrate corresponding to the still-image YUV data, the still-image YUV data being static image sequence data if it is determined that the cache ratio exceeds the third preset cache ratio threshold; and
   the transmitting the cached data to a receiving terminal according to the adjusted bitrate comprises:
   transmitting a frame sequence of the still-image YUV data to the receiving terminal according to the bitrate corresponding to the still-image YUV data, wherein the receiving terminal plays an image corresponding to the still-image YUV data and outputs prompt information corresponding to an undesired state of the network.

15. The non-transitory computer-readable storage medium according to claim 14, after determining that the cache ratio exceeds the third preset cache ratio threshold, the method further comprising:
   extracting audio data from the cached data,
   wherein the transmitting the cached data to a receiving terminal according to the adjusted bitrate further comprises:
   transmitting the audio data to the receiving terminal, so that the receiving terminal plays audio corresponding to the audio data while display the image corresponding to the still-image YUV data and the prompt information.

16. The method according to claim 1, further comprising:
   determining, among multiple ranges, a range that the cache ratio belong to, each of the multiple ranges corresponding to a preset bitrate, a higher range corresponding to a lower preset bitrate; and
   adjusting the bitrate of the cached data to be the preset bitrate corresponding to the range that the cache ratio belongs to.

17. The apparatus according to claim 6, wherein the processor is further configured for:
   determining, among multiple ranges, a range that the cache ratio belong to, each of the multiple ranges corresponding to a preset bitrate, a higher range corresponding to a lower preset bitrate; and
   adjusting the bitrate of the cached data to be the preset bitrate corresponding to the range that the cache ratio belongs to.

18. The non-transitory computer-readable storage medium according to claim 11, the method further comprising:
   determining, among multiple ranges, a range that the cache ratio belong to, each of the multiple ranges corresponding to a preset bitrate, a higher range corresponding to a lower preset bitrate; and
   adjusting the bitrate of the cached data to be the preset bitrate corresponding to the range that the cache ratio belongs to.

* * * * *